Figure 1:
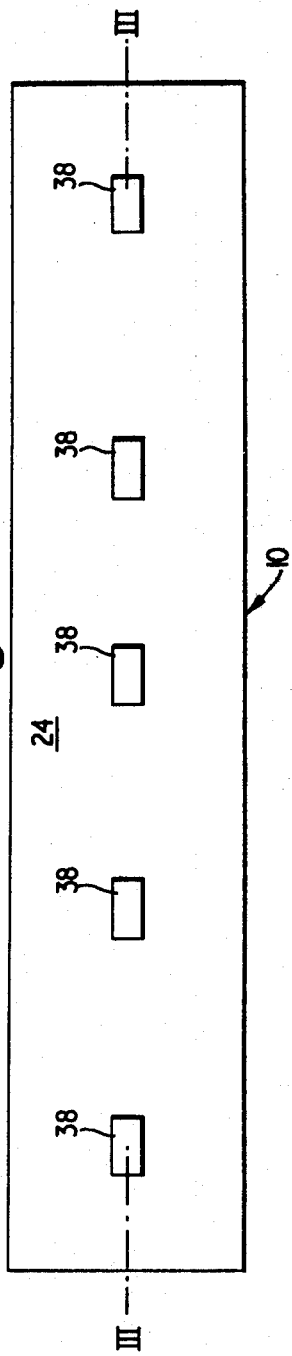

United States Patent [19]

Shaw

[11] 4,314,527
[45] Feb. 9, 1982

[54] REARING UNIT

[75] Inventor: John C. M. Shaw, Louth, England

[73] Assignee: Spotmanor Limited, Spilsby, England

[21] Appl. No.: 129,304

[22] Filed: Mar. 11, 1980

Related U.S. Application Data

[63] Continuation-in-part of Ser. No. 943,092, Sep. 18, 1978, abandoned.

[51] Int. Cl.³ .......................... A01K 1/00; F24F 7/06
[52] U.S. Cl. ....................................... 119/16; 98/33 R
[58] Field of Search ....................... 119/16, 17, 18, 21, 119/31, 33; 98/33 R

[56] References Cited

U.S. PATENT DOCUMENTS

| | | | |
|---|---|---|---|
| 2,057,627 | 10/1936 | Ferris | 119/16 X |
| 2,061,712 | 11/1936 | Martin | 119/31 |
| 2,335,173 | 11/1943 | Corey | 119/21 |
| 3,396,702 | 8/1968 | Trussell | 119/17 |
| 3,677,229 | 7/1972 | Blough et al. | 119/16 |
| 3,951,336 | 4/1976 | Miller et al. | 119/16 X |

*Primary Examiner*—Hugh R. Chamblee
*Attorney, Agent, or Firm*—John C. Smith, Jr.

[57] ABSTRACT

A rearing unit for farm animals formed of a closed body having cages mounted along the sides thereof in which the animals are disposed and constrained, air inlets formed in the roof of the body along the center line thereof and air outlet formed in the floor of the unit at the sides thereof, said air outlets are connected to an air extraction fan or fans disposed so that the air which is withdrawn from the body of the unit is expelled beneath the unit.

17 Claims, 7 Drawing Figures

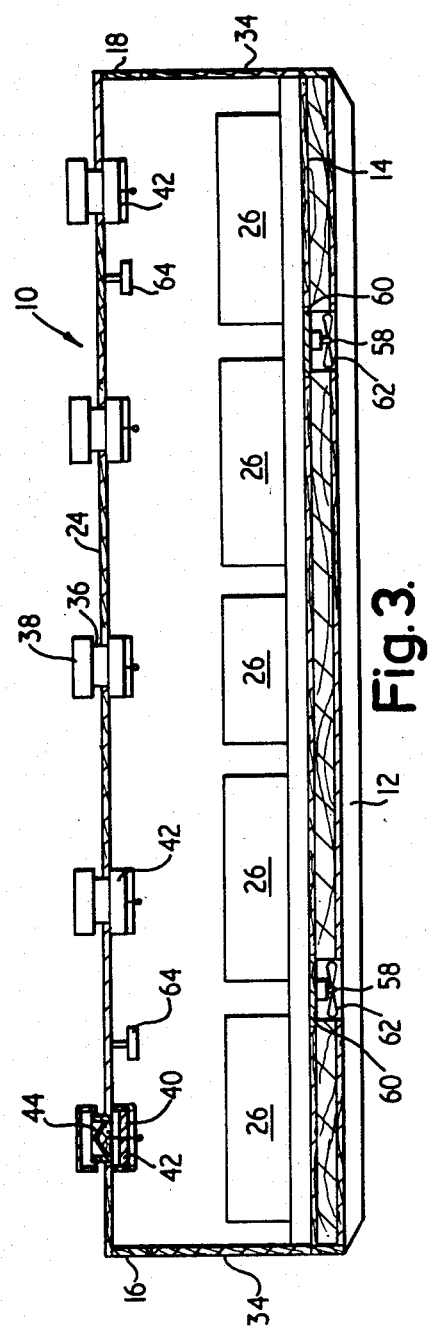
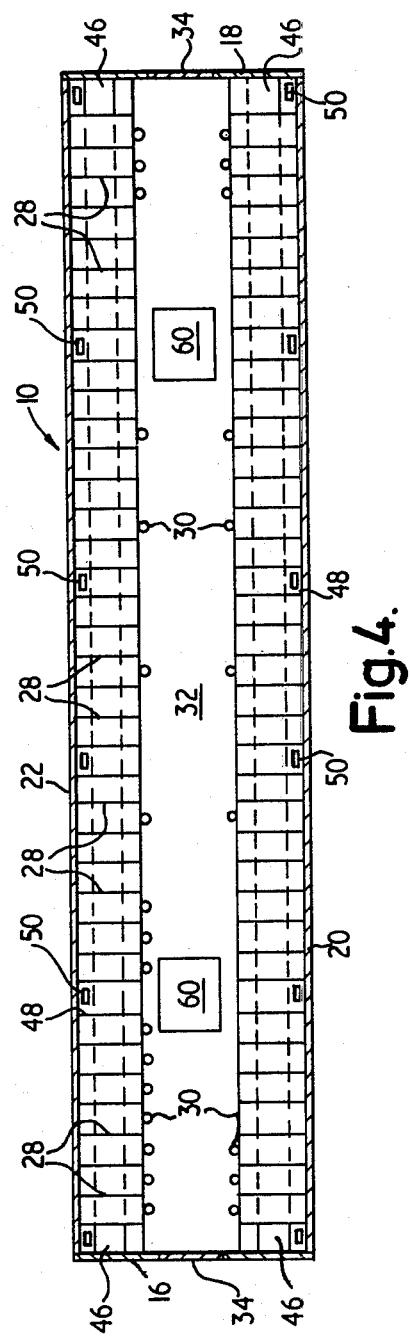

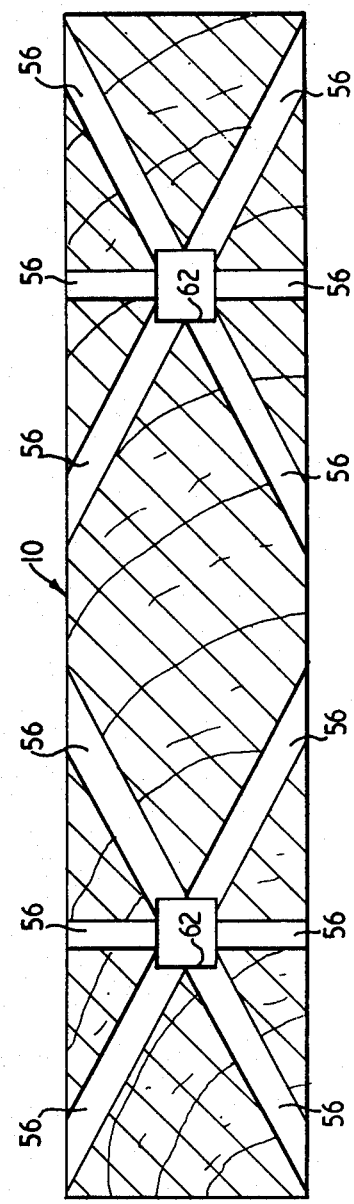
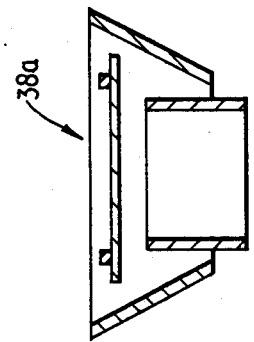
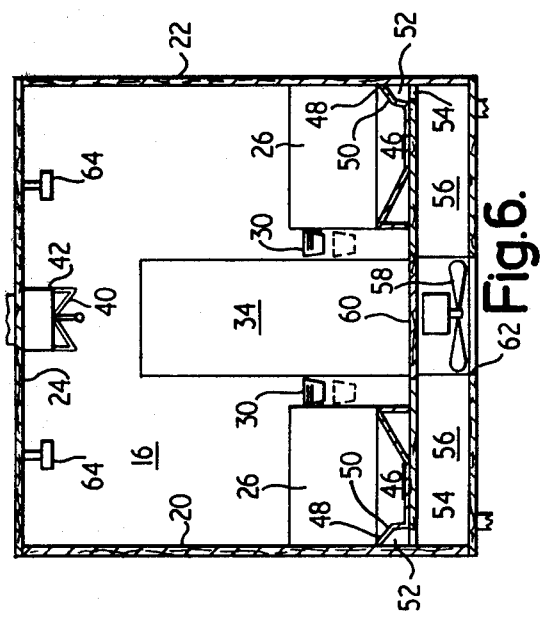

REARING UNIT

This is a continuation-in-part of copending U.S. patent application Ser. No. 943,092 filed Sept. 18, 1978 and now abandoned and relates to a rearing unit for farm animals and more particularly, but not exclusively, to rearing units for animals such as calves.

It has been found under normal farm conditions to be difficult to rear baby calves without incurring unacceptable losses of the animals. Such losses of the animals occur due to a variety of reasons but it has been found that one major cause is due to the animals' contracting infections such as pneumonia.

The object of this invention is to provide a unit in which animals such as calves can be reared without incurring unacceptably high losses of the animals.

According to one aspect of this invention, a rearing unit for farm animals comprises a substantially closed rectangular body having at least one cage mounted therein which is adapted to have an animal disposed therein; air inlet means formed in the upper portion of the body for allowing air to enter the body; air outlet means formed in the lower portion of the body through which air is withdrawn from the body; and air extraction means disposed beneath a floor of the unit for withdrawing air through the air outlet means from the body of the unit; characterised in that the air withdrawn from the body of the unit by the air extraction means is expelled beneath the unit.

It has been found that animals such as baby calves are sensitive to the speed and direction of air flow past and around the animal, and if this air flow is of low velocity but of a sufficiently high volume to produce adequate ventilation of the animals' environment and the direction of the air flow is controlled, the animal is less likely to contract an infection such as pneumonia than if it is placed in an environment where the direction of air flow is uncontrolled, such as, for example, where draughts occur; and in an environment where the necessary changes of air are achieved by high speed, low volume air flow.

Preferably, the air inlet means is disposed on the longitudinal centre line of the body, and the air extraction means comprises air outlet apertures located adjacent to side walls of the body so that the flow of air through the unit is directed from the centre of the body towards the sides thereof. Preferably, also, each air outlet aperture is formed in the floor of the unit adjacent to the side walls thereof.

A trough is, preferably, mounted on the floor of the unit at each side thereof and extends parallel to the side walls of the unit and the side of each trough adjacent to the sides of the body of the unit may be raised and provided with an inclined upper surface in which air outlet openings are formed at spaced-apart intervals therealong. Preferably, the raised side portion of each trough forms an air outlet passage providing communication between the air outlet openings in the upper surface of the raised side of the trough and the air outlet apertures in the floor of the unit.

Preferably, also, the air extraction means comprises at least one air extraction fan which is connected to the outlet apertures by ducting formed beneath the floor of the body of the unit so that air is withdrawn through each air outlet opening and air outlet aperture from the body of the unit. Each air extraction fan is, preferably, disposed beneath the floor of the unit on the longitudinal centre line thereof so that the air extracted thereby is expelled beneath the unit; and two fans may be provided, each of which is disposed in spaced-apart relationship on the longitudinal centre line of the unit.

Preferably, heating means is provided for heating the air in the unit and control means is provided for controlling the speed of each air extraction fan and the operation of the heating means to maintain a desired volume of air flow through the unit and also control the temperature and humidity of the air in the unit. Preferably, also, the air inlet means comprises at least one inlet formed in the roof of the body, and each air inlet may be provided with valve means to enable the flow of air therethrough to be adjusted. Each air inlet is, preferably, provided with air filtration and diffusion means for filtering and diffusing the air flowing therethrough. Preferably, the external end of each air inlet is provided with a cowling to restrict the reverse flow of air therethrough.

Preferably, also, a row of cages is provided along each side wall of the unit with the longitudinal axis of each cage extending transversely of the unit, and the cages may be provided with removable partitions so that the sizes of the cages can be varied according to the numbers and sizes of the animals which are to be disposed therein. A drinking and feeding unit is, preferably, provided at the end of each cage adjacent to the longitudinal centre line of the body of the unit.

Figure 2:
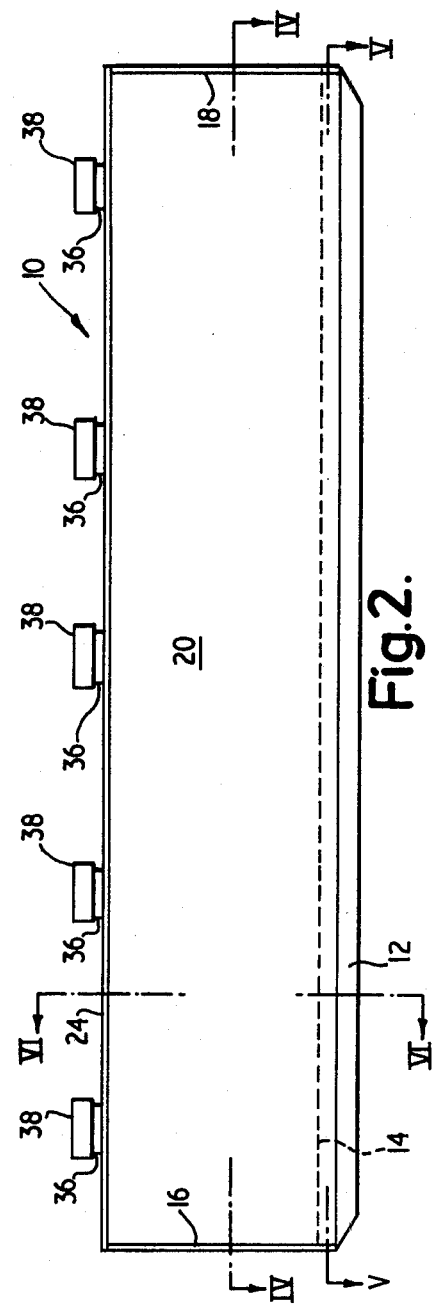

A preferred embodiment of this invention will now be described, by way of example only, with reference to the accompanying drawings of which:

FIG. 1 is a plan view of a rearing unit;
FIG. 2 is a side elevation of the rearing unit;
FIG. 3 is a sectional side elevation on the line III—III in FIG. 1 of the drawings;
FIG. 4 is a sectional plan view on the line IV—IV in FIG. 2 of the drawings;
FIG. 5 is a sectional plan view on the line V—V in FIG. 2 of the drawings;
FIG. 6 is a sectional end elevation on the lines VI—VI in FIG. 2 of the drawings; and
FIG. 7 is a sectional side elevation of an alternative cowling.

Referring now to the drawings, a rearing unit for farm animals, such as baby calves, comprises a substantially closed rectangular wooden body indicated generally at 10 which is mounted on two spaced-apart longitudinally extending skid members 12. The unit is capable of being moved slidably on the skid members 12 to enable it to be located in a required position on, for example, a concrete base (not shown).

The body 10 comprises a rectangular wooden floor 14 having two wooden end walls 16, 18 and two wooden side walls 20, 22 extending upwardly from the edges of the floor 14, and a wooden roof 24 extending between the upper edges of the end walls 16, 18 and the side walls 20, 22.

The mounting of the body 10 on the skid members 12 also spaces the floor 14 apart from the surface of the concrete base (not shown) on which the unit is positioned so that an air space is formed between said floor and said base.

Two rows of cages 26 are mounted in the body 10 and extend along each side wall 20, 22 over substantially the entire length thereof. The cages 26 are provided with removable partitions or divisions 28 so that the cages 26 can be arranged to consist of individual units whilst enabling the size of each cage unit to be varied to accommodate different sizes and/or numbers of calves as they develop and grow. Each individual cage unit is arranged so that during the early stages of development of the calves when only one calf is placed in each cage unit, the longitudinal axis of each cage unit extends transversely of the body 10 and the calf is constrained so that the head of the calf faces towards the centre line of the body 10 of the rearing unit. The cages 26 can be formed of any suitable material and are provided with a slatted floor through which animal excrement can pass. A continuous bucket type of feeding unit 30 is mounted at the end of each cage unit adjacent to the centre line of the body 10 and two alternative mounting positions for the feeding unit 30 are provided so that the calf can either feed from a teat (not shown) mounted on the bucket or direct from the bucket itself. A central walkway 32 is provided between the rows of cages 28 and access thereto from the exterior of the body 10 is provided by doors 34 formed in each end wall 16, 18.

Five spaced-apart air inlets 36 are formed in the roof 24 on the centre line thereof and each air inlet 36 is provided with a cowling 38 to restrict or prevent the creation of draughts in the body 10 of the rearing unit. An alternative type of cowling which could be mounted on each air inlet 36 is indicated generally at 38(a) in FIG. 7 of the drawings. An air deflector assembly 40 is mounted beneath each air inlet 36 to deflect the air flowing therethrough into the unit and thus avoid the production of a jet of air from each air inlet 36. An air filter and diffuser 42 formed of an open cell foam plastics material is mounted in each air inlet 36. A valve 44 is also disposed in each air inlet 36 to enable the flow of air through each air inlet 36 to be adjusted. The valves 44 can be arranged to be manually operable or, alternatively, the valves 44 can be power-operated, for example electrically, so that the flow of air into the body 10 of the rearing unit can be controlled by a separate control means (not shown).

Filtered air thus enters the body 10 of the rearing unit through the air inlets 36 at spaced-apart points on the centre of the roof 24, and the volume of air entering the body 10 of the unit can be controlled and adjusted by means of the valves 44.

Alternatively, the valves 44 can be dispensed with and a plate member formed of, for example, wood having a series of holes formed therein is inserted into the air inlet 36 to restrict the flow of air therethrough. Different plate members having different diameters and spacing of holes therein may be provided to afford the facility of adjusting the rate of flow of air through the inlets 36 by changing the plate members therein.

A trough 46 formed of a glass-reinforced plastics material is mounted on the floor 24 of the unit at each side thereof and each trough 46 extends along the full length of the unit. Each trough 46 is disposed beneath an associated one of the rows of cages 26 and is adapted to collect the animal excrement falling through the slatted floor of the cages 26 enabling this excrement to be easily removed periodically from the rearing unit. The side of each trough 46 adjacent to the associated side 20, 22 of the body 10 of the unit is raised and is provided with an inclined upper surface 48 in which air outlet openings 50 are formed at spaced-apart intervals therealong. The raised side portion of each trough 46 forms an air outlet passage 52 which provides communication between air outlet openings 50 formed in the inclined surface 48 of the trough 46. The air outlet apertures 54 are disposed at spaced-apart intervals along each side of the body 10 of the unit and are each connected by ducting 56 disposed beneath the floor 14 to one of the two electrically-operated fans 58 mounted beneath the floor 14 on the centre line of the body 10. Consequently, the fans 58 are mounted directly beneath the central walkway 32 and access can be provided to the fans 58 through removable covers 60 in the central walkway 32 of the floor 14 to facilitate, for example, servicing of the fans at periodic intervals.

The fans 58 draw air from the body 10 of the unit through the air outlet openings 50, the air outlet passages 52, the air outlet apertures 54 and the ducting 56 and this air is expelled by the fans 58 beneath the rearing unit through openings 62. The expellation of the air by the fans 58 into the air space between the floor 14 and the base on which the unit stands has the beneficial effect of providing a restriction or choke on the outlet of the fans 58 which reduces any tendency of recreation of a reverse air flow through the fans 58 into the unit, which could produce draughts therein. In addition, it also facilitates the production of a low velocity, high volume rate of air flow in the unit which has been found to be environmentally beneficial to the rearing of animals such as calves as the reduction of possibility of creating reverse air flow through the fans 58 into the unit enables said fans to be operated at a lower minimum speed setting than would otherwise be possible without provision of such a restriction or choke on the fan outlets. The expellation of air beneath the unit onto the ground or concrete base also has the advantage that the distribution of the smells or particles of dirt carried by the expelled air into the immediate vicinity of the unit is reduced by directing the expelled air onto the ground beneath the unit.

The withdrawal of air from the body 10 of the rearing unit by the fans 58 causes air to flow into the unit through the air inlets 36 in the roof 24. The air flowing into the unit through the air inlets 36 is filtered and the direction of flow thereof is diffused by the air filters and diffusers 42 so that a uni-directional blast of air is not created. The air flow in the unit itself is directed from the centre line of the body 10 of the unit past the animals in the cages 26 towards the sides of the unit and thus, when the animals are constrained in their associated cage so as to face towards the centre line of the unit, the air flows past the caged animals from the nose to the tail thereof which has also been found to be beneficial and to make the animals less likely to contract an infection such as pneumonia.

Background heating units 64 are mounted at spaced-apart intervals on the roof 24 of the unit and the heating unit 64 can be of the electrically-operated fan heated type or, alternatively, may be gas fired heaters. Alternatively, the heating units 64 can be mounted in other positions in the unit such as on the walls thereof and one particularly suitable location would be to mount the units 64 adjacent to the floor 14 at each side of the central walkway 32.

The control means (not shown) is adapted to control the speed of the fans 58 in addition to controlling the operation of the background heating units 54 and, if desired, the operation of the valves 44 in the air inlets 36. The control means (not shown) is provided with a facility whereby a minimum rate of flow of air can be selected by setting each of the fans 58 to rotate at least at a minimum speed. This, of course, provides control of the minimum rate of air flow in the unit and also facilitates the accurate control of the temperature of the air in the body 10 of the unit. The temperature of the air in the unit is sensed by a temperature sensing device (not shown) such as a thermister and when the temperature of the air in the unit rises above a predetermined desired value, the control means increases the speed of the fans 58 to increase the air flow through the unit and simultaneously switches off the background heating units 64. This type of control arrangement facilitates the accurate control of the temperature of the air in the unit without creating sudden surges of air flow within the unit.

It will therefore be apparent that the above described rearing unit thus provides a carefully controlled environment for the baby calves which greatly assists the rearing of the calves and assists in minimising losses due to infection, such as pneumonia.

It will also be appreciated that the rearing unit can be used for rearing animals other than calves such as, for example, piglets, without departing from the scope of the invention.

What I claim is:

1. A rearing unit for farm animals comprising:
   (a) a substantially closed rectangular body defined by floor, wall and roof structural elements and having at least one cage mounted therein which is adapted to have an animal disposed therein;
   (b) means for supporting said body such that it is spaced from the ground to provide a restricted space between said floor and the ground;
   (c) air inlet means formed in at least one of said structural elements in the upper portion of said body for allowing air to enter said body;
   (d) air outlet means formed in at least one of said structural elements in the lower portion of said body through which air is withdrawn from said body; and
   (e) air extraction means including exhaust outlet means disposed beneath said floor structural element for withdrawing air through said air outlet means from the body of said unit and through said air extraction means and exhaust outlet means, said exhaust outlet means being arranged to project said withdrawn air onto the ground;
   (f) whereby the air withdrawn from said body of said unit by said air extraction means is expelled beneath said unit into said restricted space and onto the ground and said restricted space between said exhaust outlet means and the ground provides a choke preventing reverse air flow through said air extraction means.

2. A rearing unit according to claim 1, wherein said structural elements comprise a floor, a ceiling and a plurality of walls extending between said floor and ceiling; said air inlet means is formed in said roof on the longitudinal centerline of said body and said air outlet means comprises a plurality of air outlet apertures located adjacent to at least two of said walls at opposite sides of said body whereby the flow of air through said unit is directed from the center of said body towards the sides thereof.

3. A rearing unit according to claim 2, wherein said air outlet apertures are formed in said floor adjacent to said walls at opposites sides of said body.

4. A rearing unit according to claim 3, further comprising an elongated trough mounted on said floor and extending substantially parallel to each of said walls at opposites sides of said body.

5. A rearing unit according to claim 4, wherein the side of each trough adjacent to one of said walls extends upwardly with an inclined upper surface, a plurality of air outlet openings being formed at spaced-apart intervals therealong.

6. A rearing unit according to claim 5, wherein said upwardly extending side portion of each trough forms an air outlet passage extending between said air outlet openings in said upper surface of said upwardly extending side of said trough and said air outlet apertures in said floor structural element.

7. A rearing unit according to claim 3, further comprising duct means formed beneath said floor and extending between said air outlet apertures and said air extraction means, said air extraction means comprising at least one fan for withdrawing air through said air outlet apertures, through said duct means and fan and onto the ground.

8. A rearing unit according to claim 7, wherein each air extraction fan is disposed beneath said floor on a longitudinal centerline thereof so that air extracted thereby is expelled beneath said unit.

9. A rearing unit according to claim 8, comprising at lest two of said air extraction fans disposed in spaced-apart relationship along said longitudinal centerline of said unit.

10. A rearing unit according to claim 7, further comprising heating means for heating the air in said unit and control means sensitive to temperature and humidity connected to said heating means and to said air extraction fan for controlling the speed of said air extraction fan and the operation of said heating means to maintain a desired volume of air flow through said unit and also control the temperature and humidity of the air in said unit.

11. A rearing unit according to claim 1, wherein said air inlet means comprises at least one inlet formed in said roof structural element.

12. A rearing unit according to claim 11, further comprising valve means in said at least one air inlet to adjust the flow of air therethrough.

13. A rearing unit according to claim 11, further comprising air filtration and diffusion means connected to said at least one air inlet for filtering and diffusing the air flowing therethrough.

14. A rearing unit according to claim 11, further comprising a cowling at the external end of said at least one air inlet to restrict the reverse flow of air therethrough.

15. A rearing unit according to claim 1, comprising a row of said cages along at least one of said walls with the longitudinal axis of each cage extending transversely of the longitudinal axis of said unit.

16. A rearing unit according to claim 15, wherein said cages include removable partitions whereby the sizes of said cages can be varied according to the numbers and sizes of the animals which are to be disposed therein.

17. A rearing unit according to claim 1, further comprising a feeding and drinking unit at the end of each cage adjacent to the longitudinal centerline of said body.

* * * * *